Figure 1:
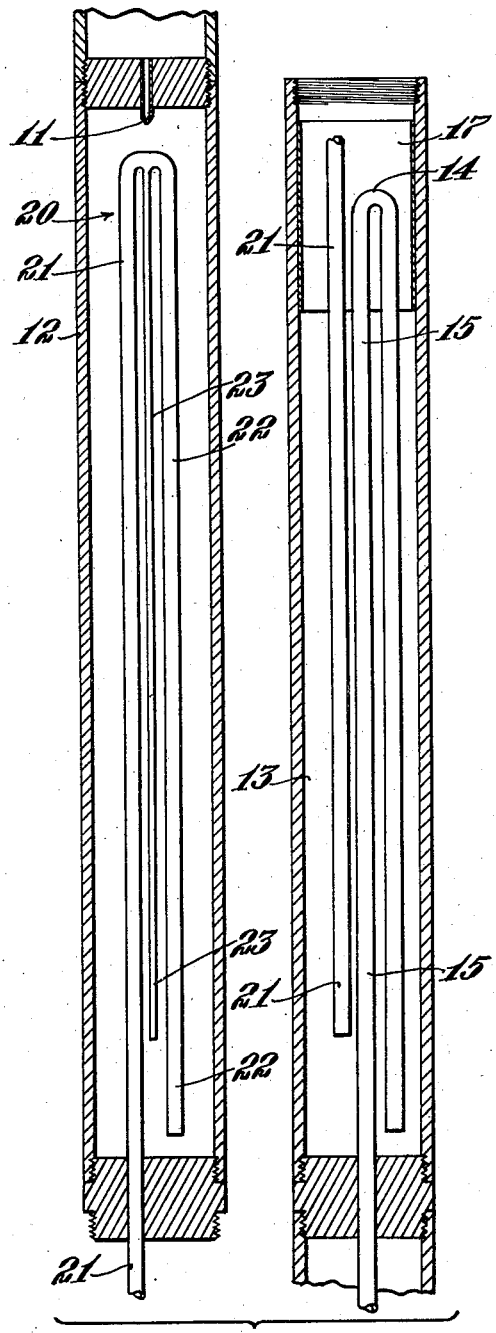

March 19, 1940.　　　H. S. DAVIS　　　2,193,862
INCLINOMETER
Filed May 29, 1939

Inventor
Harold S. Davis
by Roberts, Cushman & Woodbury
Att'ys.

Patented Mar. 19, 1940

2,193,862

UNITED STATES PATENT OFFICE 2,193,862

INCLINOMETER

Harold S. Davis, Riverside, Conn., assignor to Sperry-Sun Well Surveying Company, Philadelphia, Pa., a corporation of Delaware Application May 29, 1939, Serial No. 276,393

7 Claims. (Cl. 33—205.6)

This invention relates to inclinometers such for example as the type described in the Winn Patent No. 2,134,808, in which the making of a record of the inclination of the instrument is timed by the flow of a liquid. In the device of that patent, the timing liquid, delivered slowly through a restricted orifice to an intermediate chamber, is finally delivered relatively quickly into a record chamber by means of a siphon. The slowness of flow through the restricted orifice delays the delivery of liquid to the record chamber sufficiently to enable the instrument first to be lowered to the desired level in the bore hole. The siphon is an advantageous feature of the instrument in that it avoids a gradual accumulation of liquid in the recording chamber during the lowering of the instrument to the level at which the record is made.

In experimenting with the siphonic delivery of liquid into the record-making chamber in inclinometers of this type, I have discovered that the accuracy of the record can be improved by modifying the siphon in such manner as to avoid a sudden and accelerated inflow of liquid into the recording chamber at the last stage of the delivery. As at present constructed, instruments of this type deliver the main body of the liquid fairly quickly into the recording chamber, but deliver the last portion of the liquid at a considerably more rapid rate so that just before the maximum height of liquid is reached in the recording chamber there is a sudden inrush of liquid which has a disturbing effect on the accuracy of the record of the liquid surface. In general my present invention aims to avoid this disadvantage and to provide for a smoother and more nearly uniform delivery of the liquid into the recording chamber especially at the time just before the liquid reaches its maximum height.

Other objects of invention and features of advantage and utility will be apparent from this specification and its drawing wherein the invention is explained by way of example.

Figure 2:
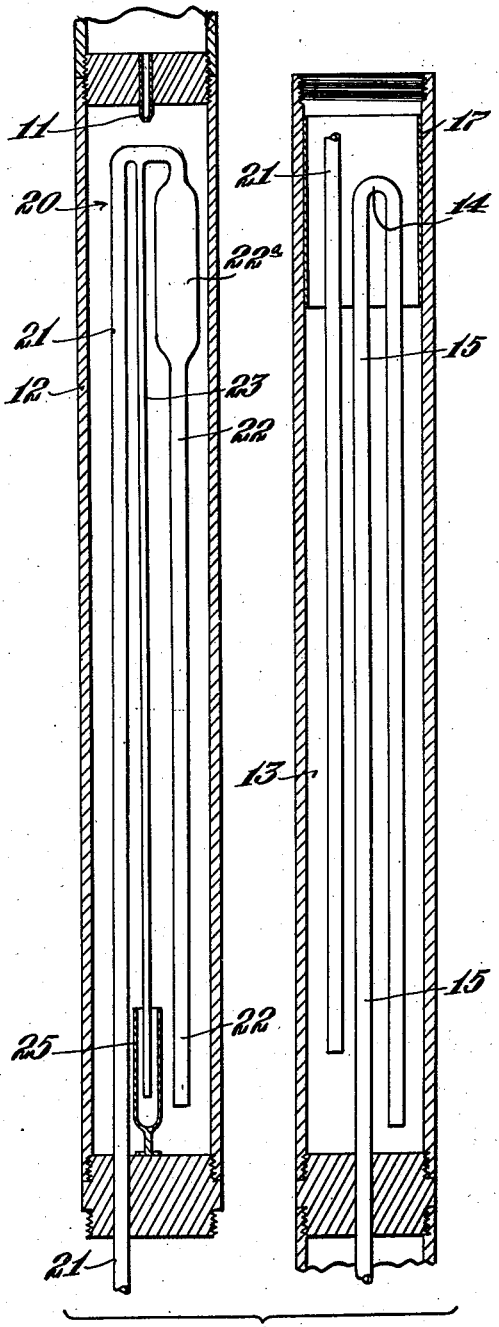

In the drawing:

Fig. 1 is a diagrammatic view in the nature of a vertical section through the portion of an inclinometer containing the intermediate liquid chamber and the recording chamber, according to this invention, the figure being broken in two, with the upper portions appearing at the left and the lower portion at the right; and Fig. 2 is a similar view of a modified form of the invention.

Referring to Fig. 1, the record-making liquid, delivered through any suitable restricted orifice 11 to an intermediate liquid supply chamber 12 during the lowering of the instrument into the well, is delivered from the intermediate liquid supply chamber 12 into a record-making chamber 13 by a siphon, hereinafter more fully described. The liquid rises quickly in the record-making chamber 13 until it reaches the bend 14 of a discharge siphon 15 which thereupon conducts it to a lower reservoir not shown. At the height of the bend 14 of the siphon 15, which is approximately the maximum height reached by the liquid in the recording chamber, the free surface of the liquid makes a mark upon a suitable record sheet 17 within the recording chamber, and this marked record sheet when removed from the instrument serves as a record of the inclination of the instrument at the time the record was made.

It will be understood that the liquid, flowing into the recording chamber, will necessarily rise slightly above the bend 14 in the discharge siphon due to the slight delay in starting of this siphon.

In Fig. 1 the siphon employed to deliver the liquid from the intermediate liquid chamber 12 to the record-making chamber 13 is indicated generally at 20 and includes a long leg 21 extending from the bend of the siphon in the chamber 12 down to nearly the bottom of chamber 13, and a shorter leg 22 wholly in chamber 12.

Where a siphon includes only these two legs as in the Winn Patent No. 2,134,303, the last portion of liquid delivered by the siphon is the liquid contained in the shorter leg and this is delivered at continually accelerating speed, thereby tending to cause a surge of the liquid in the recording chamber and hence an inaccuracy in the record. When the siphon has exhausted sufficient liquid from the intermediate chamber so that the liquid level therein drops to the level of the bottom of the shorter leg, the siphon is said to "break". It draws no more liquid upwardly into the shorter leg, but the liquid already in that leg accelerates in speed. The hydraulic head effective in delivering the liquid from the intermediate chamber just before the siphon "breaks" is represented by the distance between the entrance to the siphon and the surface of the liquid in the recording chamber. After the siphon "breaks" and as the column of liquid in the shorter leg climbs up this leg, the hydraulic head progressively increases until when the bend in the siphon is reached, it becomes equal to the height of the bend above the surface of the liquid in the recording chamber.

In the illustrated forms of my invention, this disadvantage is avoided by providing the siphon near its bend with a restricted tube 23 extending downwardly and having an entrance that is uncovered by the falling liquid surface in the supply chamber before the entrance to the leg 22 is uncovered. Thus in Fig. 1, the tube 23 extends down nearly but not quite to the level of the entrance of the leg 22 of the siphon. The diameter of this additional tube 23 is considerably smaller than that of the other legs of the siphon. For example if the internal diameter of the legs 21 and 22 is $\frac{3}{16}$ of an inch, the internal diameter of the leg 23 may be slightly less than $\frac{1}{16}$ of an inch.

With this construction, when the liquid level in chamber 12 reaches the bottom of the restricted diameter tube 23, air is admitted to the latter and accordingly admitted at a limited rate to the bend in the siphon. Depending upon the diameter and height of tube 23 with relation to the diameter and height of the leg 22, this admission of air to the bend in the siphon causes the siphon to "break" either immediately or after a short period during which the admission of air retards the drawing in of liquid through the leg 22. In addition the resistance offered by the tube 23 to the flow of air up to the bend in the siphon affords an additional resistance to the downward flow of liquid through the longer leg 21, preventing the column of liquid in this longer leg from rushing suddenly into the lower chamber.

In the modified form of the device of Fig. 2, where similar parts are designated by the same reference numerals as in Fig. 1, the controlling influence of the restricted tube 23 is increased by the provision of an enlargement in the form of a bulb 22ª in the leg 22 of the siphon near the bend. This bulb may for example have a capacity of about 60 cc., and, as soon as the tube 23 has admitted air to the bend, functions to maintain a hydraulic head in the leg 22 of the siphon during the emptying of the longer leg 21.

Since most or all of the contents of the leg 22 of the siphon will empty back into the chamber 12 and since it is desirable for the restricted air inlet tube 23 to extend to nearly the bottom of the chamber, it is preferable in the device of Fig. 2 having an enlarged bulb in the leg 22, to provide means for preventing this back flow of liquid from entering the bottom of the restricted air inlet tube 23. As shown in Fig. 2, this is readily accomplished by providing a partition in the lower part of the supply chamber adapted to isolate from the remainder of the liquid in the supply chamber a portion of liquid adjacent to the entrance to the restricted tube, so that liquid flowing back down from the leg 22 is prevented from entering the tube 23. This partition is preferably in the form of a cup-shaped member 25 surrounding the lower end of the tube 23.

A further effect of such partition is to render it unnecessary for the restricted leg 23 to have its entrance above the bottom of the leg 22 (although it is so illustrated in Fig. 2), for it will be apparent that even if the tube 23 in Fig. 2 extended somewhat below leg 22, the available liquid within the relatively small cup-shaped partition 23 would be exhausted before the liquid outside the cup-shaped partition uncovered the end of leg 22.

While the drawing for convenience shows the tube 23 as having a constant diameter and being restricted by virtue of its relatively long length and small diameter, the restriction of tube 23 may be local, that is, it may have a very small diameter at one height and a larger diameter elsewhere.

From the foregoing it will be seen that in both illustrated forms of the invention the siphon which delivers the liquid from the intermediate chamber to the recording chamber is permitted to operate in the same way as usual siphons during the main part of delivery of liquid to the recording chamber. However, after the siphon has been caused to "break," the siphon, unlike that of the Winn patent, almost immediately ceases transferring liquid from the shorter leg 22 into the longer leg 21 (and thence into the recording chamber), thus very substantially reducing the final rush of liquid into the recording chamber.

Moreover after the siphon "breaks" the relatively small diameter of the restricted tube 23 retards the flow of the column of liquid in the longer leg 21. In the embodiment of Fig. 2, the retarding of this column in the longer leg is further aided by the body of liquid stored in the bulb 22ª, which in running back down the shorter leg, not only keeps this leg closed against the inlet of air, but also exerts a suction effect partially counter-balancing the suction created by the column in the longer leg, thereby retarding the flow of the column.

I claim:

1. An inclinometer having therein a record-making chamber, a liquid supply chamber above the record-making chamber, a siphon including a shorter leg having an entrance in the supply chamber for the reception of liquid into the siphon, a longer leg extending into the record-making chamber for the delivery of liquid thereto, and a further more restricted leg communicating with the upper part of the siphon and having an entrance in the supply chamber positioned to be uncovered by the liquid at a time when the surface of the liquid in said supply chamber is still above the entrance to the shorter leg.

2. An inclinometer having therein a record-making chamber, a liquid supply chamber above the record-making chamber, a siphon including a shorter leg having an entrance in the supply chamber for the reception of liquid into the siphon, a longer leg extending into the record-making chamber for the delivery of liquid thereto, and means operative during the delivery of liquid by the siphon to admit air to the upper part thereof at a time when the surface of the liquid in said supply chamber is still above the entrance to the shorter leg.

3. An inclinometer having therein a record-making chamber, a liquid supply chamber above the record-making chamber, a siphon including a shorter leg having an entrance in the supply chamber for the reception of liquid into the siphon, a longer leg extending into the record chamber for the delivery of liquid thereto, and a further more restricted leg communicating with the upper part of the siphon and having an entrance in the supply chamber above the entrance to the shorter leg.

4. An inclinometer having therein a record-making chamber, a liquid supply chamber above the record-making chamber, a siphon including a shorter leg having an entrance in the supply chamber for the reception of liquid into the siphon, and a longer leg extending into the record-making chamber for the delivery of liquid thereto, and a further more restricted leg communicating with the upper part of the siphon and having an entrance in the supply chamber positioned to be uncovered by the liquid at a time when the surface of the liquid in said supply chamber is still above the entrance to the shorter leg, the said shorter leg of the siphon including an enlargement near its upper part to hold a quantity of liquid adapted to flow back down the shorter leg after the admission of air to the said restricted leg.

5. An inclinometer having therein a record-making chamber, a liquid supply chamber above the record-making chamber, a siphon including a shorter leg having an entrance in the supply chamber for the reception of liquid into the siphon, a longer leg extending into the record-making chamber for the delivery of liquid thereto, means operative during the delivery of liquid by the siphon to admit air to the upper part thereof at a time when the surface of the liquid in said supply chamber is still above the entrance to the shorter leg, and an enlargement in the shorter leg near its upper part to hold a quantity of liquid adapted to flow down the shorter leg after the admission of air to the upper part of the siphon.

6. An inclinometer having therein a record-making chamber, a liquid supply chamber above the record-making chamber, a siphon including a shorter leg having an entrance in the supply chamber for the reception of liquid into the siphon, a longer leg extending into the record-making chamber for the delivery of liquid thereto, a further more restricted leg communicating with the upper part of the siphon and having an entrance in the supply chamber, and a partition in the supply chamber effective, when the level drops to the partition, to isolate from the remainder of the liquid in the supply chamber a portion of liquid adjacent to the entrance to the restricted leg.

7. An inclinometer having therein a record-making chamber, a liquid supply chamber above the record-making chamber, a siphon including a shorter leg having an entrance in the supply chamber for the reception of liquid into the siphon, a longer leg extending into the record-making chamber for the delivery of liquid thereto, a further more restricted leg communicating with the upper part of the siphon and having an entrance in the supply chamber, and a cup-shaped element surrounding the entrance to the restricted tube in the supply chamber, said cup-shaped element being effective, when the level drops to the cup-shaped element, to isolate from the remainder of the liquid in the supply chamber a portion of liquid adjacent to the entrance to the restricted leg.

HAROLD S. DAVIS.